(12) United States Patent
Preston et al.

(10) Patent No.: US 11,397,599 B2
(45) Date of Patent: Jul. 26, 2022

(54) SYSTEM AND METHOD FOR GENERATING A GRAPHICAL USER INTERFACE (GUI) INDICATING AN ELIGIBILITY FOR TRIGGERING AN ACTION

(71) Applicant: HealthSnap, Inc., Miami, FL (US)

(72) Inventors: Chase Preston, Miami, FL (US); Yenvy Truong, Lighthouse Point, FL (US)

(73) Assignee: HealthSnap, Inc., Miami, FL (US)

( * ) Notice: Subject to any disclaimer, the term of this patent is extended or adjusted under 35 U.S.C. 154(b) by 0 days.

(21) Appl. No.: 17/139,524

(22) Filed: Dec. 31, 2020

(65) Prior Publication Data

US 2021/0208907 A1 Jul. 8, 2021

Related U.S. Application Data

(60) Provisional application No. 62/956,924, filed on Jan. 3, 2020.

(51) Int. Cl.
| | | |
|---|---|---|
| *G06F 3/048* | (2013.01) | |
| *G06F 9/451* | (2018.01) | |
| *G06F 3/0482* | (2013.01) | |
| *G06F 9/52* | (2006.01) | |
| *G06F 9/54* | (2006.01) | |

(52) U.S. Cl.
CPC ............ *G06F 9/453* (2018.02); *G06F 3/0482* (2013.01); *G06F 9/52* (2013.01); *G06F 9/542* (2013.01)

(58) Field of Classification Search
CPC .......... G06F 3/0482; G06F 9/453; G06F 9/52; G06F 9/542
See application file for complete search history.

(56) References Cited

U.S. PATENT DOCUMENTS

| | | | | |
|---|---|---|---|---|
| 5,617,526 A | * | 4/1997 | Oran ..................... | G06F 3/0481 715/779 |
| 2010/0162170 A1 | * | 6/2010 | Johns ..................... | G04G 21/00 715/834 |
| 2013/0117696 A1 | * | 5/2013 | Robertson .............. | G16H 15/00 715/763 |
| 2014/0129008 A1 | * | 5/2014 | Utter, II ................. | G16H 50/20 700/92 |
| 2014/0282036 A1 | * | 9/2014 | Shottan ................. | G06F 3/0484 715/738 |

(Continued)

*Primary Examiner* — Claudia Dragoescu
(74) *Attorney, Agent, or Firm* — Sterne, Kessler, Goldstein & Fox P.L.L.C.

(57) ABSTRACT

Described herein is a system for rendering a graphical user interface (GUI) indicating eligibility for triggering a predefined action. In an embodiment, a central system may render a graphical user interface (GUI) including a visual representation of a given calendar month sectioned by each day in the given calendar month. A visual indicator may be rendered on the visual representation of the calendar month. The central system may further render columns in each section of the of the visual representation of the given calendar month as each day in the calendar month passes, in response receiving a data transmission on at least one day within the given time period. A height of each column may increment a given amount in response to a total amount of days with a data transmission in the given time period being incremented.

20 Claims, 8 Drawing Sheets

(56) References Cited

U.S. PATENT DOCUMENTS

| | | | |
|---|---|---|---|
| 2015/0067724 A1* | 3/2015 | Johnson | H04N 21/4668 725/32 |
| 2018/0240547 A1* | 8/2018 | Albert | G16H 40/20 |
| 2020/0243187 A1* | 7/2020 | Lavoie | H04L 51/24 |

* cited by examiner

SYSTEM AND METHOD FOR GENERATING A GRAPHICAL USER INTERFACE (GUI) INDICATING AN ELIGIBILITY FOR TRIGGERING AN ACTION

CROSS-REFERENCE TO RELATED APPLICATIONS

This application claims priority to U.S. Provisional Patent Application No. 62/956,924, filed on Jan. 3, 2020, the contents of which are incorporated herein by reference in their entirety.

BACKGROUND

Systems may trigger predefined actions for a user based on received data transmissions. Tracking data transmissions and determining eligibility for triggering the predefined actions may be a complex process. The frequency of data transmissions from various users may be erratic and voluminous. This causes errors and inconsistencies in triggering the predefined actions.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

FIG. 1 is an example user profile GUI according to an example embodiment.

FIG. 4 is an example data transmission calendar GUI indicating a patient's data transmission information over several months according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Figure 2:
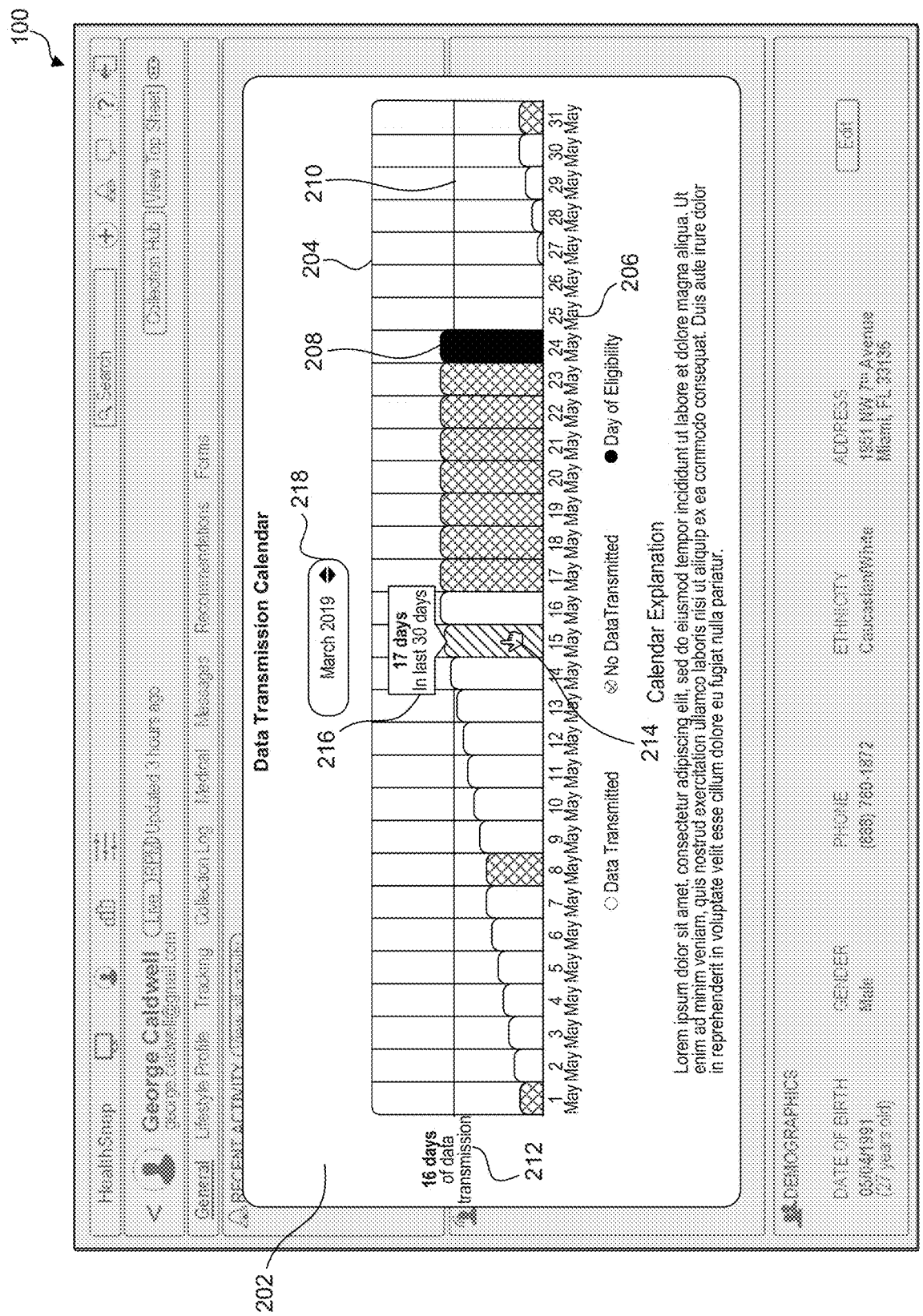
FIGS. 2-3 illustrate an example graphical user interface (GUI) indicating eligibility for triggering action according to an example embodiment.

Described herein is a system for rendering a graphical user interface (GUI) indicating eligibility for triggering action. As stated above, systems may keep track of data transmissions for triggering eligibility for predefined actions. The data transmissions may be from various users and may be erratic and voluminous. The system described herein generates a GUI for tracking data transmissions and eligibility for triggering predefined actions based on the received data transmissions.

In particular, a central system may render a graphical user interface (GUI) including a visual representation of a given calendar month sectioned by each day in the given calendar month. A visual indicator may be rendered on the visual representation of the calendar month. The first visual indicator may be positioned at a height corresponding to a threshold number of days with data transmissions necessary within a given time period for triggering a predefined action. The central system may further render objects, such as columns, in each section of the visual representation of the given calendar month as each day in the calendar month passes, in response to receiving a data transmission on at least one day within the given time period. A height of each column may be incremented by a given amount in response to a total number of days with a data transmission in the given time period. The height of a given column is higher or lower relative to the visual indicator based on a difference between the total number of days with data transmissions within the given time period and the threshold number of days with data transmissions necessary within the given time period for triggering a predefined action.

The central system may further render a different visual indicator on a column indicating eligibility for triggering the predefined action. The different visual indicator may be rendered on the column in response to determining that the total number of days with data transmissions within the given time period is greater than or equal to the threshold number of days with data transmissions necessary within the given time period for triggering a predefined action, and a predefined number of days have passed since a previously triggered predefined action.

By visually keeping track automatically of the data transmissions and eligibility for triggering a predefined action, the system eliminates possible errors or inconsistencies in triggering the predefined action for a given user.

As a non-limiting example, the system generating a GUI indicating eligibility for triggering a predefined action may be implemented for remote patient monitoring (RPM). RPM is the ability for a healthcare provider to remotely monitor their patient's physiological data. By providing an RPM service, a healthcare provider is able to submit reimbursement requests to The Centers for Medicare & Medicaid Services (CMS). For example, a healthcare provider may request reimbursement for the following reimbursement codes: a set up reimbursement (code: 99453), a data transmission reimbursement (code: 99454), and a treatment reimbursement (code: 99457 & 99458).

A healthcare provider may be eligible for a set up reimbursement based on remote monitoring of physiologic parameter(s) (e.g., weight, blood pressure, pulse oximetry, respiratory flow rate), and specifically for initial set-up and patient education regarding the use of equipment. The set up reimbursement may require setting up a patient in an RPM program and confirming that they are connected, they have a device that they can connect to the RPM program, and data is streaming.

A healthcare provider may be eligible for a data transmission reimbursement based on continued remote monitoring of physiologic parameter(s) (e.g., weight, blood pressure, pulse oximetry, respiratory flow rate). Specifically, the reimbursement may be awarded based on the healthcare provider receiving a certain number of data transmissions through the RPM program over a given period of time, such as 30 days, 1 month, 6 months, and/or the like. The data transmission reimbursement may require a patient transmitting data, including health data about the patient, for a minimum number of days within a specified time window (e.g., 16 out of every 30 days) and after a specified amount of days have passed since the last triggered data transmission reimbursement eligibility or since the date of enrollment.

A healthcare provider may be eligible for a treatment reimbursement based on remote physiologic monitoring treatment management services, including a certain number of minutes of clinical staff/physician/other qualified healthcare professional time in a given time period, such as 20 or more minutes per calendar month. The treatment reimbursement may require interactive communication with the patient/caregiver during the time period and receiving data transmissions for a minimum number of days within a specified time window (e.g., 16 out of every 30 days) and after a specified amount of days have passed since the last triggered data transmission reimbursement eligibility or since the date of enrollment. For example, the treatment reimbursement may require interactive communication with the patient/caregiver during the time period and data transmission reimbursement eligibility.

Figure 1:
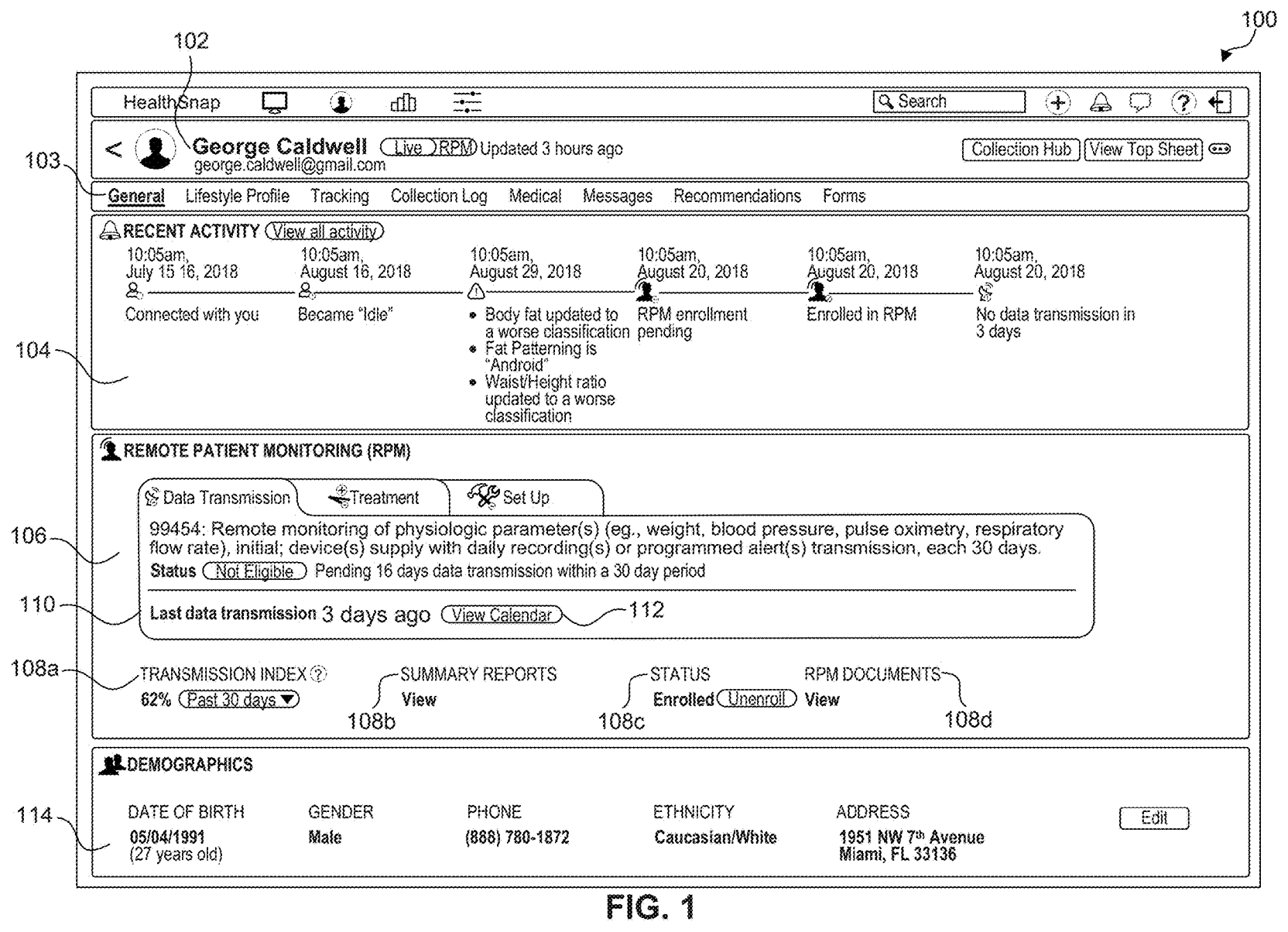

An example use case follows. FIG. 1 is an example user profile GUI 100 according to an example embodiment. User profile GUI 100 may provide user information to an entity implementing the system for rendering a graphical user interface (GUI) indicating an eligibility for triggering action. User profile GUI 100 may be rendered on a portal provided to the entity.

As a non-limiting example, the entity may be a healthcare provider, and the user may be a patient. User profile GUI 100 may be accessed using the portal. User profile GUI 100 may include information about a patient signed up for remote patient monitoring (RPM). RPM may allow healthcare providers to remotely monitor patients, thus becoming eligible for healthcare and insurance reimbursements such as data transmission reimbursement, treatment reimbursement, and set up reimbursement. The patient profile 100 may include patient's name 102, a recent activity section 104, an RPM section 106, and a demographics section 114. User profile GUI 100 may also include tabs 103, including general, lifestyle profile, tracking, collection log, medical, messages, recommendations, and forms.

Recent activity section 104 may include a timeline of activity for the patient. The timeline may range from enrollment for RPM to the date of the last data transmission. The timeline of activity may also include alerts related to the patient's health.

RPM section 106 may include a summary 110 of the reimbursement eligibility. In particular, summary 110 may include tabs for summaries for the data transmission reimbursement, treatment reimbursement, and set up reimbursement. The tab for the data transmission reimbursement may include reimbursement eligibility status, the days since the last data transmission, and a view calendar button 112. In response to selecting view calendar button 112, a graphical user interface (GUI) indicating eligibility for triggering action may be rendered. The visual representation of the calendar may be displayed in the foreground while user profile GUI 100 may remain in the background.

The tab for treatment (not shown) may include treatment reimbursement eligibility status and a button to confirm that healthcare has been provided for a certain amount of time. For example, the healthcare provider may confirm that 20 minutes or more of clinical staff/physician/other qualified healthcare professional time in a calendar month have been provided. If the healthcare provider has confirmed that 20 minutes or more of interactive communication was spent with the patient, the tab for treatment may include a date and time of the confirmation and a button to un-confirm that 20 minutes or more of interactive communication was spent with the patient. The tab for set up (not shown) may include a set up eligibility status.

RPM section 106 may also include transmission index 108a, summary reports 108b, status 108c, and RPM documents information 108d. Transmission index 108a is a measure of the frequency of data transmission by a patient. Transmission index 108a may be calculated by dividing the number of days of data transmission by a total amount of days the patient has been enrolled in RPM. For example, if in the past 30 days data transmissions were received from the patient on 12 days, transmission index 108a for the past 30 days would be calculated as follows: (12/30)*100=40%. Transmission index 108a may be calculated for the past 30 days, 3 months, 6 months, 1 year, or total time of enrollment. A user may select the amount of time for calculating transmission index 108a using a dropdown menu.

Summary reports 108b may include a link to view all the summary reports for the patient. The eligibility reports include all the patients enrolled in RPM, their eligibility status, and their summary of reports of that month. A summary report includes a list of data collection, any notes made that month, any messages sent, snapshot of their lifestyle profile, insurance information, any recommendations sent, patient information, and/or the like. This may be a PDF file that can be uploaded to the healthcare provider's billing system.

Status 108c indicates an enrollment status of the patient. A healthcare provider may select to un-enroll the patient using an un-enroll button positioned next to the enrollment status. RPM documents 108d may include a link to view all RPM documents for a patient, such as insurance information, reason, diagnosis, consent forms, and/or the like.

The demographics section 114 can include patient information such as date of birth, gender, phone number, ethnicity, address, and/or the like.

Figure 3:
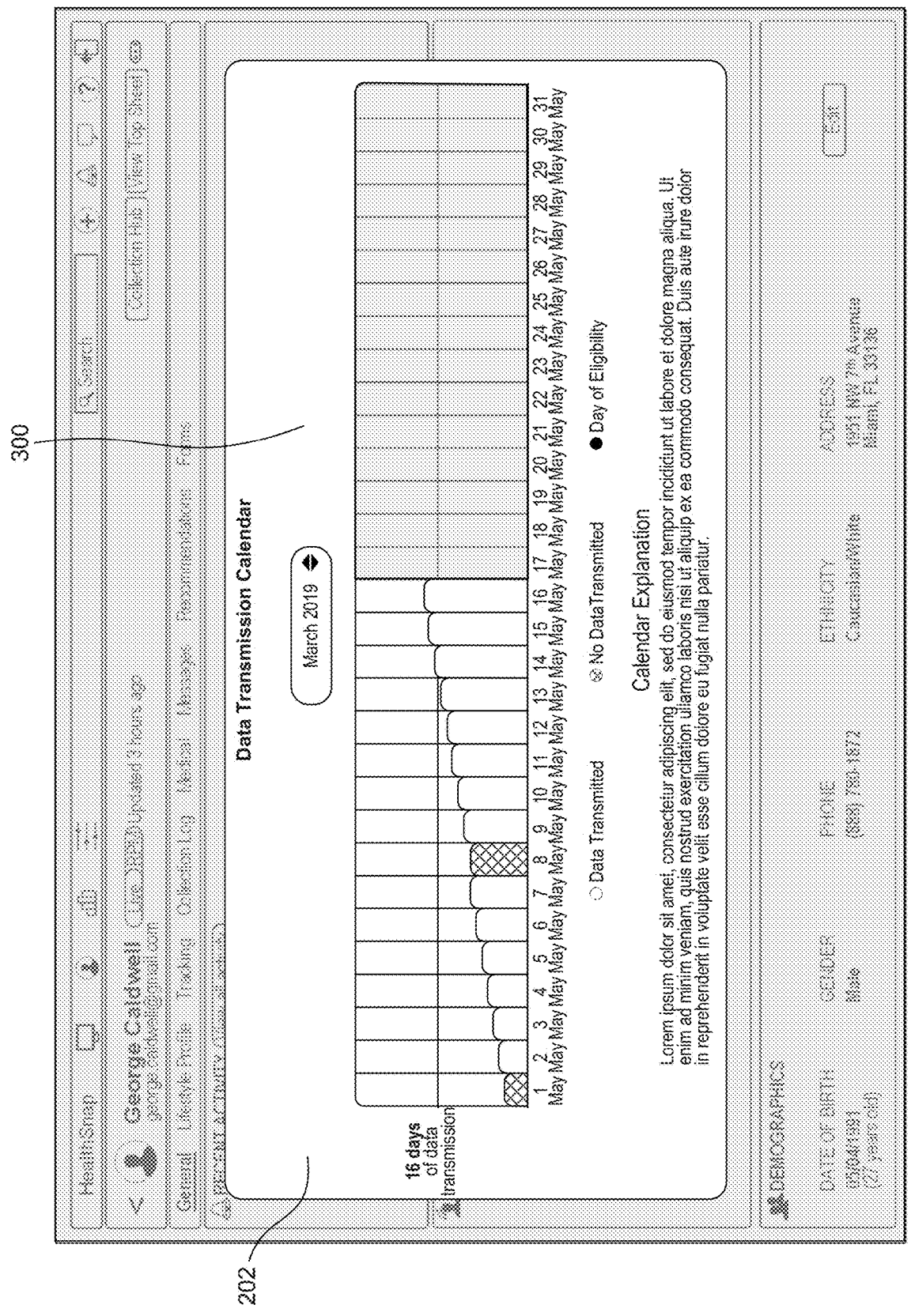

FIGS. 2-3 illustrate an example graphical user interface (GUI) indicating an eligibility for triggering a predefined action. The GUI may visually track data transmissions and eligibility for triggering a predefined action based on the data transmissions. An entity, such as a healthcare provider, may implement the GUI indicating eligibility for triggering a predefined action for tracking data transmissions from patients. The GUI may further track eligibility for triggering a predefined action, such as the healthcare provider is eligible for a data transmission reimbursement for a given patient based on the received data transmissions. The GUI may be embodied as a data transmission GUI 202.

In an embodiment, data transmission GUI 202 may include a visual representation of a calendar month sectioned by each day of the calendar month. The visual representation of the calendar may track data transmission reimbursement eligibility for a given patient. In particular, a healthcare provider may be eligible for the data transmission reimbursement in response to determining the given patient has transmitted data transmissions including health datasets on a specified number of days within a specified time window and after a specified number of days since a date of a last triggered reimbursement eligibility for the given patient or a date of reimbursement enrollment for the given patient.

The visual representation of the calendar may visually track the number of data transmissions received from the given patient, frequency of data transmissions, the date of the data transmissions, number of days passed in the specified time window, and number of days remaining until the healthcare provider may be eligible for the data transmission reimbursement.

The visual representation may have a section 204 representing each day 206 of the month. Each section 204 may include a column 208 representing a total number of days on which data transmissions of health datasets have been received within a specified time window for the patient. The height of the column may correspond with the total number of days on which data transmissions have been received within the specified time window. As an example, a column after receiving two days worth of data transmissions within the specified time window may be taller than the column after receiving only one day of data transmission within the specified time window. In the event that there have been zero data transmissions in the specified time window, the section for that day may not include column 208.

Data transmission GUI 202 may also include a first visual indicator 210 extending across the visual representation of the calendar. First visual indicator 210 may be positioned on the visual representation at a height corresponding to a minimum number of days on which data transmissions are to be received in a specified time window to be eligible for reimbursement. For example, in the event on a given day the total number of days on which data transmissions are received within the specified time window is more than the minimum number of required days of data transmissions, column 208 for that day may be taller than the height of first visual indicator 210. Alternatively, in the event that, on a given day, the total number of days with data transmissions within the specified time window is less than the minimum number of days required, column 208 for that day may be shorter than the height of first visual indicator 210. The minimum number 212 of days with data transmissions required to be eligible for reimbursement may be indicated adjacent to first visual indicator 210. First visual indicator 210 may be a line or bar rendered across the visual representation. Data transmission GUI 202 may also include a month dropdown selection 218 for selecting a different month of the year. In response to selecting a different month, a new visual representation of the calendar month sectioned by the day of the month may be rendered.

Data transmission GUI 202 may also include a second visual indicator overlaid on a column in a section corresponding to a date on which a data transmission occurred. The second visual indicator may be a color, pattern, symbol, and/or the like on the column. For example, on the days that there has been a data transmission, column 208 may be purple, while on days when there has not been a data transmission, column 208 may be gray. A third visual indicator may also be rendered on the visual representation of the calendar month, which divides days of the given month that have passed and days of the given month in the future.

Data transmission GUI 202 may also include a fourth visual indicator overlaid on column 208 indicating reimbursement eligibility. The fourth visual indicator may be a pattern, color, symbol, and/or the like overlaid on the column. For example, on a given day in the calendar month, in response to determining the patient has transmitted data transmissions on a minimum number of days within the specified time window and after the specified number of days since a date of a last triggered data transmission reimbursement eligibility for the patient or the date of reimbursement enrollment for the patient, the healthcare provider may become eligible for data transmission reimbursement for that patient. The column in the section for that given day may be rendered a different color, such as green, to indicate eligibility status.

In response to the healthcare provider becoming eligible for data transmission reimbursement for that patient, the total number of days with data transmissions and the number of days in the time frame may be reset to zero. A section corresponding to the day following the date the healthcare provider became eligible for reimbursement may not include a column as the total amount of data transmissions may be zero unless a data transmission has been received for that day, in which case a column may be rendered at a height corresponding to a single day with a data transmission.

A user may interact with data transmission GUI 202 using an input device such as a stylus, mouse, or touch screen. In response to a user hovering over column 208 using an input device, a popup 216 may be rendered above the column. Popup 216 may include the total amount of data transmissions received in the specified time window.

As a non-limiting example shown in FIG. 2, a healthcare provider may be eligible for reimbursement for a given patient in response to determining the patient has data transmissions on at least 16 days within the 30 days and after the 30 days have passed since a date of a last triggered reimbursement eligibility for the patient or the patient's date of reimbursement enrollment. The date of the last triggered reimbursement eligibility may be April 24. This means the next reimbursement eligibility may be triggered 30 days after April 24 if data transmissions are received from the patient on a minimum of 16 days within the 30 days. In column 220 (May 15), the patient has transmitted data transmissions, including health datasets, on 17 days. However, reimbursement eligibility is not yet triggered as 30 days have not passed since April 24. At column 222 (May 24), 30 days have passed since April 24, and 17 data transmissions have been received from the patient within the 30 days, thusly, the reimbursement eligibility is triggered.

After the reimbursement eligibility is triggered, the amount of data transmissions, the number of days passed since the last reimbursement eligibility, and the number of days out of 30 (the time frame) that have passed may be reset to zero. A patient may not transmit a health dataset on May 25 or May 26, and therefore, the sections corresponding to May 25 and May 26 may not include columns. The first data transmission after May 24 may be on May 27, as indicated by column 224.

With reference to FIG. 3, sections corresponding to dates in the future may be grayed out on the data transmission GUI 202. For example, section 300 may correspond to dates in the future, and so section 300 may be grayed out. The third visual indicator 302 may divide days that have passed and days in the future 300.

Figure 4:
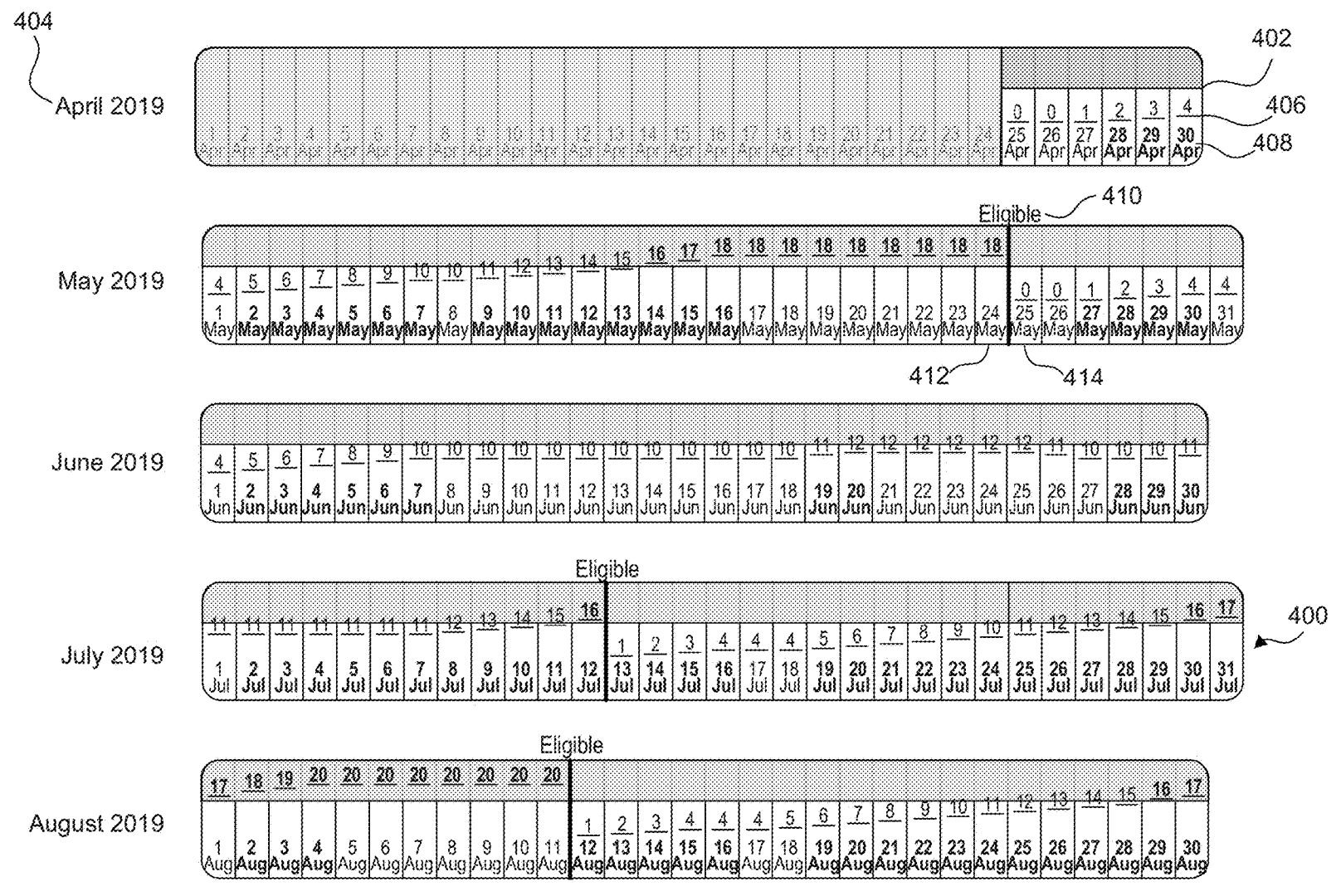

FIG. 4 is an example data transmission log 400 illustrating a visual representation of a patient's data transmissions over several months. In an embodiment, the data transmission log 400 may not be rendered on the GUI for the user. Alternatively, in an embodiment, the data transmission log 400 may be rendered on a GUI for the user. The data transmission log 400 may include sections 402 for each day of a month 404. Sections for the days prior to a patient's enrollment may be grayed out or otherwise visually diminished. The sections after the patient's enrollment may indicate the day of the month and the month. Sections 402 may also include a numerical amount 406 indicating the total number of days within a given time period on which data was logged. A horizontal line may correspond to the numerical amount 406. As the numerical amount increases, the position of the numerical amount and horizontal line may be positioned higher in section 402 as compared to the previous section 402. An area at the top of section 402 may be visually different from the rest of the section. The visually different part of the section may correspond with a minimum number of days of logged data required for data transmission reimbursement. For example, when the numerical amount of the total days of logged data is less than the minimum number of days of logged data required, the numerical amount and horizontal line may be positioned below the visually different area of section 402. Alternatively, when the numerical amount of the total days of data transmission is greater than the minimum number of days of data transmissions required, the numerical amount and horizontal line may be included within the visually different area of section 402. As an example, the day of the month and the month may be gray or otherwise visually diminished to signify not receiving data corresponding to that date. In comparison, the day of the month and the month may be green or otherwise visually highlighted to signify receiving data corresponding to that date.

In response to determining that the patient has logged data on a minimum number of days within the specified time window, and after the specified amount of days since a date of the last triggered reimbursement eligibility for the patient or the date of reimbursement enrollment, the healthcare provider may become eligible for the data transmission reimbursement for that patient. In response to the healthcare provider becoming eligible for the data transmission reimbursement, the data transmission log 400 may include a visual indicator 410 indicating eligibility. The visual indicator 410 may be, for example, a vertical line positioned in between section 412 corresponding to the date after the healthcare provider became eligible for the data transmission reimbursement and section 414 corresponding to a date directly after the date corresponding to section 412. The word "Eligible" or another highlighting identifier may be positioned above the vertical line.

As a non-limiting example, a healthcare provider may be eligible for data transmission reimbursement after 16 days of data logged within a 30 day period and after 30 days from when the data transmission reimbursement was triggered or 30 days after the enrollment date. In the example illustrated in FIG. 4, a patient may enroll in RPM on April 25. The data transmission log 400 may start tracking data transmissions from the patient on April 25 after enrollment. The first health data from a patient may be timestamped on April 27. Section 400 corresponding to April 27 includes a "1" for 1 day of data transmission received, and the "27" and "April" may be green to indicate a received data transmission. Data transmissions for the patient may have timestamps of April 27 through April 30, totaling four data transmissions. The numerical amount of "4" may be included in the section corresponding to April 30. No data transmissions that have a timestamp of May 1 are received. The total number of days with data transmissions is still four. Therefore, a numerical amount of "4" is included in the section corresponding to May 1. The date, "1" and "May" is gray, to indicate that no data transmission has been received that day.

On May 14, the patient reaches 16 days of data transmissions within the past 30 days. However, as 30 days have not passed since the enrollment date, the data reimbursement eligibility is not yet triggered. Once 30 days have passed since the enrollment date of April 25, on May 24, the data reimbursement transmission eligibility is triggered. Once data transmission reimbursement eligibility is triggered, the total amount of days of data transmissions is reset to 0. Therefore, as no data transmission has a timestamp of May 25, and as the clock restarts on May 25, the total amount of days with data logged is shown as 0 on May 25.

Within the next 30 day span from May 25 to June 23, the patient does not have 16 days of data logged. In light of this, the start of the 30-day time frame (to receive 16 days of data transmissions) shifts by one day as each day passes beyond the 30 days. For example, on June 24, the start of the 30-day time frame is shifted to change from May 25 to May 26. On June 25, the 30-day time frame is shifted to start from May 27, and on June 26, the 30-day time frame is shifted to start from May 28. As data transmissions have not been received having timestamps of June 25, 26, and 27, the total number of days of logged data decreases for days past June 25 because the data transmission on May 27 is no longer counted. Data transmission reimbursement eligibility is triggered again on July 12, after receiving data transmissions for 16 days in a 30-day window after at least 30 days have passed since the last triggered reimbursement eligibility of May 24. Data transmission eligibility is triggered again on August 11 after receiving data transmissions for 16 days in a 30-day window and after at least 30 days have passed since the last triggered reimbursement eligibility of July 12.

Figure 5:
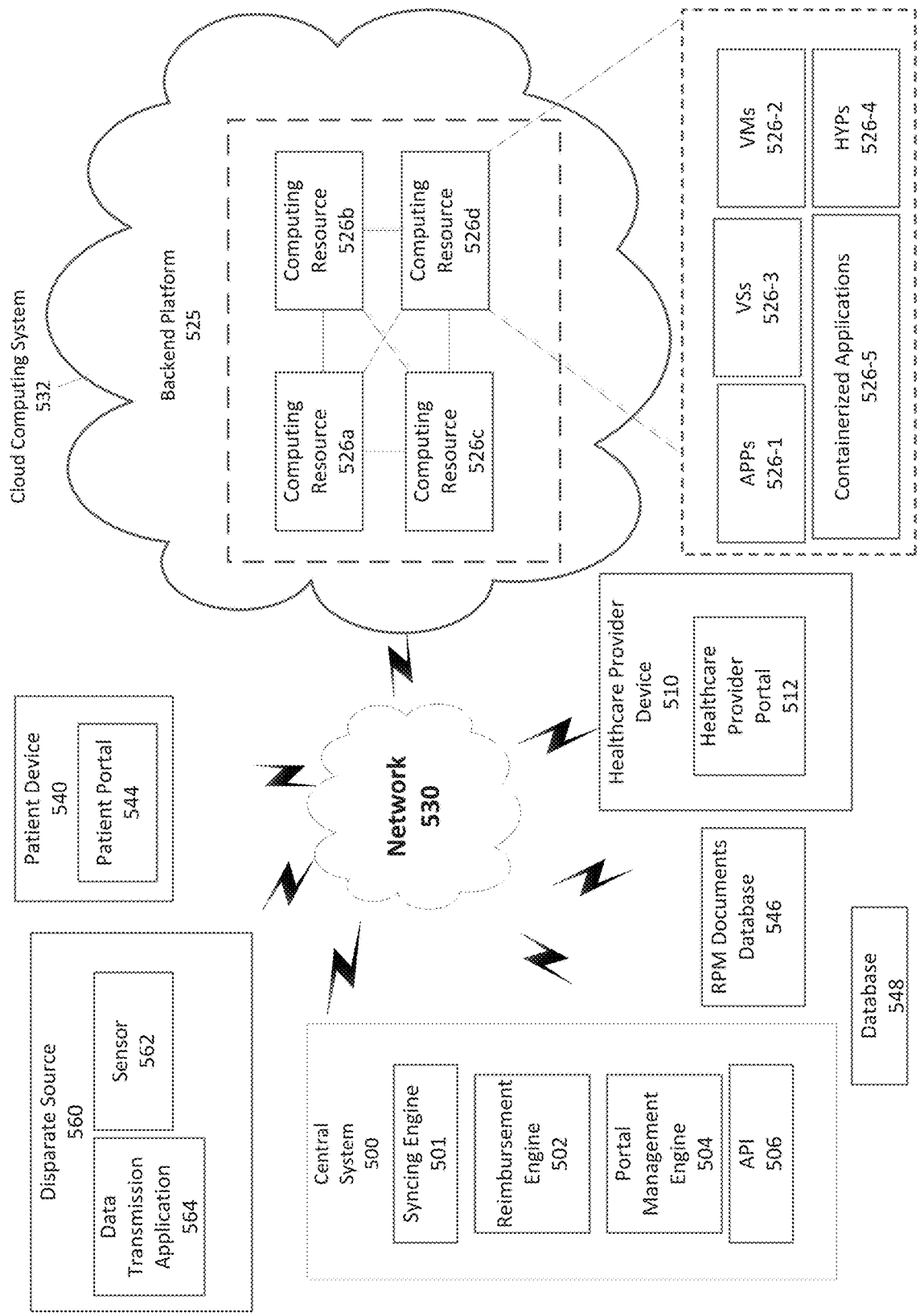
FIG. 5 is a block diagram of an example environment in which systems and/or methods described herein may be implemented according to an example embodiment.

FIG. 5 is a block diagram of an example environment in which systems and/or methods described herein may be implemented. The environment may include a central system 500, a healthcare provider device 510, a patient device 540, a remote patient monitoring ("RPM") documents database 546, a database 548, a backend platform 525, a cloud computing environment 532, multiple disparate sources 560, and a network 530. The devices within the environment may be connected through wired connections, wireless connections, or a combination of wired and wireless connections. Central system 500 may reside fully or partially on the cloud computing system 532 or may be a standalone system. The central system may include a syncing engine 501, a reimbursement engine 502, and the portal management engine 504. Central system 500 may further include an API 506. The API may be configured to interface with healthcare provider device 510, patient device 540, and the disparate sources 560. Patient device 540 may include a portal 544. Healthcare provider device 510 may include a healthcare provider portal 512. Portal 544 and healthcare provider portal 512 may be websites or executable applications configured to interface with central system 500.

A disparate source 560 may be a wearable device coupled to a wrist strap, watch, glasses, headband, waistband, and/or the like, or a smart device such as a smartphone or tablet. A disparate source 560 may also be an application executing on a smart device, where the application gathers its own data. Disparate source 560 may include a sensor 562 to measure data for a user and a data transmission application 564. Data transmission application 564 may interface with central system 500. Sensor 562 may sense, track, and store the measured data for a user. This sensing, tracking, and storing may occur continuously or periodically. Data transmission application 564 may extract the data from sensor 562. Data transmission application 564 may extract the data from sensor 562 after a specified amount of time, at intervals, or on the detection of new data being sensed and stored. The data may be health data, including, for example, weight, blood pressure, pulse oximetry, respiratory flow rate, and/or the like.

In an embodiment, disparate source 560 may be coupled to patient device 540. Once coupled to patient device 540, portal 544 may pull the data from sensor 562. Alternatively, disparate source 560 may operate independently from patient device 540.

In an example embodiment, one or more portions of the network 530 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 525 may include a server or a group of servers. In an embodiment, the backend platform 525 may be hosted in a cloud computing environment 532. It may be appreciated that the backend platform 525 may not be cloud-based or may be partially cloud-based. Central system 500 may include one or more devices configured to interface with the backend platform 525.

The cloud computing environment 532 includes an environment that delivers computing as a service, whereby shared resources, services, etc., may be provided to the backend platform 525. The cloud computing environment 532 may provide computation, software, data access, storage, and/or other services that do not require end-user knowledge of a physical location and configuration of a system and/or a device that delivers the services. The cloud computing system 532 may include computer resources 526*a-d*.

Each computing resource 526*a-d* includes one or more personal computers, workstations, computers, server devices, or other types of computation and/or communication devices. The computing resource(s) 526*a-d* may host the backend platform 525. The cloud resources may include compute instances executing in the computing resources 526*a-d*. The computing resources 526*a-d* may communicate with other computing resources 526*a-d* by wired connections, wireless connections, or a combination of wired or wireless connections.

Computing resources 526*a-d* may include a group of cloud resources, such as one or more applications ("APPs") 526-1, one or more virtual machines ("VMs") 526-2, virtualized storage ("VS") 526-3, one or more hypervisors ("HYPs") 526-4, and one or more containerized applications 526-5.

Application 526-1 may include one or more software applications that may be provided to or accessed by central system 500. Alternatively, the application 526-1 may eliminate a need to install and execute software applications on patient device 540 or healthcare provider device 510. The application 526-1 may include software associated with backend platform 525 and/or any other software configured to be provided across the cloud computing environment 532. The application 526-1 may send/receive information from one or more other applications 526-1, by the virtual machine 526-2.

Virtual machine 526-2 may include a software implementation of a machine (e.g., a computer) that executes programs like a physical machine. Virtual machine 526-2 may be either a system virtual machine or a process virtual machine, depending upon the use and degree of correspondence to any real machine by virtual machine 526-2. A system virtual machine may provide a complete system platform that supports the execution of a complete operating system (OS). A process virtual machine may execute a single program and may support a single process. The virtual machine 526-2 may execute on behalf of a user and/or on behalf of one or more other backend platforms 525 and may manage the infrastructure of cloud computing environment 532, such as data management, synchronization, or long-duration data transfers.

Virtualized storage 526-3 may include one or more storage systems and/or one or more devices that use virtualization techniques within the storage systems or devices of computing resource 526*a-d*. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and the location where files are physically stored. This may enable optimization of storage use, server consolidation, and/or performance of non-disruptive file migrations.

Hypervisor 526-4 may provide hardware virtualization techniques that allow multiple operations systems (e.g., "guest operating systems") to execute concurrently on a host computer, such as computing resource 526*a-d*. Hypervisor 526-4 may present a virtual operating platform to the guest operating systems and may manage the execution of the guest operating systems multiple instances of a variety of operating systems and may share virtualized hardware resources.

Containerized applications 526-5 may provide for executing distributed applications without having to launch a VM for each distributed application. Containerized applications 526-5 may be implemented by deploying virtualized application containers on a common OS using a platform. As a non-limiting example, the platform may be a platform provided Docker Inc., of San Francisco, Calif.

In an embodiment, a healthcare provider device 510 may execute or access the healthcare provider portal 512. Healthcare provider portal 512 may receive an input requesting a visual representation of a calendar of a given user to be rendered. The portal management engine 504 may generate and render a GUI for indicating eligibility for triggering an action on the healthcare provider portal 512, as shown in FIGS. 2-3. The GUI may include a visual representation of a given calendar month sectioned by each day in the given calendar month. The portal management engine 504 may render a visual indicator positioned on the visual representation of the given calendar month at a height corresponding to a threshold amount of days with data transmissions necessary within a given time period for triggering a predefined action. The visual indicator may be a horizontal line disposed across the visual representation of a calendar.

Disparate source 560 associated with a user may execute data transmission application 564. Data transmission application 564 may extract/pull data from sensor 562 of disparate source 560. Data transmission application 564 may generate a data transmission, including the data pulled from sensor 562. Data transmission application 564 may attempt to transmit the data transmission from disparate source 560 to central system 500. In response to attempting to transmit the data transmission from disparate source 560 to the central system, data transmission application 564 may embed a timestamp indicating the date and time of the attempted data transmission and a disparate source identifier in the data transmission. Additionally or alternatively, a timestamp may be added to or may be already associated with each data element within the data transmission based on a time that the data was generated, collected, or received by sensor 562. In an embodiment, data transmission application 564 may automatically transmit the data transmission to central system 500 after collecting a specified amount of data.

The API 506 may receive the data transmission from data transmission application 564. Each of the data transmissions may include one or more timestamps and a disparate source identifier. The API 506 may receive data transmissions from multiple different disparate sources. Each disparate source may be associated with the same or a different user. Additionally, the API 506 may receive multiple data transmissions from the same disparate source 560 of a single user.

The syncing engine 501 may determine a date and time corresponding to the data in the data transmission from disparate source 560 based on the timestamp. As an example, a disparate source 560 may not transmit (e.g., may attempt and fail to transmit) a data transmission as scheduled when disparate source 560 has limited network connectivity (e.g., during airplane travel), such that the data transmission is not completed until a later date. The syncing engine 501 may determine the appropriate time or date to ascribe to the data based on the timestamp so that the data transmission is accounted for the day disparate source 560 generated, collected, or received the data, or made an attempt to send the data, rather than the day when the data transmission was actually completed. The data may be stored in the database 548, based on the time stamp and the disparate source ID.

The portal management engine 504 may generate and render a column in each section of the visual representation of the given calendar month as each day in the calendar month passes, in response receiving a data transmission accounted for at least one day within the given time period, as determined by the syncing engine 501. The height of each column may increment a given amount based on a total amount of days with a data transmission in the given time period being incremented. The height of a given column is higher or lower relative to the visual indicator based on a difference between the total amount of days with data transmissions within the given time period and the threshold amount of days with data transmissions necessary within the given time period for triggering a predefined action.

The reimbursement engine 502 may determine that the total amount of days with data transmissions within the given time period is greater than or equal to the threshold amount of days with data transmissions necessary within the given time period for triggering a predefined action and a predefined amount of days have passed since a previously triggered predefined action. In this regard, the reimbursement engine 502 may determine a predefined action may be triggered. In response to determining the predefined action may be triggered, the portal management engine 504 may render a visual indicator on the given column of a section corresponding to a day when the predefined action may be triggered.

An example implementation use case follows, based on the architecture of FIG. 5, according to an embodiment of the invention. A healthcare provider may execute healthcare provider portal 512 using healthcare provider device 510. Healthcare provider portal 512 may provide the healthcare provider information. Healthcare provider portal 512 may provide the ability to generate and transmit RPM enrollment invitations to patients. Healthcare provider portal 512 may provide a selection of data that the healthcare provider would like to monitor for the patient. The data may be one or more of, for example, and without limitation, body weight, height, body fat, resting heart rate, blood pressure, VO2max, and/or the like. Prior to sending the invitation, healthcare provider portal 512 may prompt the healthcare provider to provide various types of information such as a medically-necessary RPM enrollment reason, a diagnosis, and an ordering provider. Such information may be input via a variety of interface features such as a dropdown menu containing prepopulated selections, a free input box, radio buttons, and/or the like. The ordering provider may be entered, for example, using a dropdown menu of provider names. In an embodiment, the healthcare provider may upload a comma-separated values (CSV) file, including information about the patient(s) to be invited. The patient name, contact information, reason for RPM enrollment, and diagnosis may be extracted from the CSV file and autopopulated into input boxes and dropdown menus. The invitation may be sent to the patient in an email, including a link or Short Messaging Service (SMS) message, including a link.

Once a patient is invited to enroll in RPM, a patient's profile page may be generated on healthcare provider portal 512 along with an associated status. For example, healthcare provider portal 512 may render the RPM status as "Pending" on the patient profile page. An activity may be created for "RPM enrollment pending". The healthcare provider may send reminders to the patient or cancel the invitation using the healthcare provider portal 512. The patient profile page may also include a section for RPM documents to be stored. RPM documents may include documentation containing, for example, reasons for RPM enrollment, diagnosis, insurance information, consent forms, and/or the like. The patient profile page may also include information about the patient's connected disparate source 560. Healthcare provider portal 512 may provide to the healthcare provider a patient list, including enrolled, invited, and pending patients.

In response to launching the patient portal 544 by actuating the invitation link or otherwise, portal 544 may render a popup requesting that the patient enrolls in RPM. Portal 544 may provide various options to the patient, such as options to select "Enroll" or select "I do not want to enroll". If the patient selects "I do not want to enroll", the healthcare provider receives a notification that the patient has denied the invitation to enroll in RPM. If the patient does not answer the invitation within a given time frame, they will receive an email and push notification reminder on the patient portal 512. In the event that the patient selects the "I do not want to enroll" option, for example, portal 544 may render reasons on why they should enroll in RPM. The reasons are customizable by the healthcare provider using the healthcare provider portal 512.

In response to selecting to enroll in RPM, portal 544 may prompt the patient to complete various fields, such as full name, date of birth, and phone number. Portal 544 may prompt the patient to agree to consent statements. Portal 544 may prompt the patient to agree that their provider has ordered the RPM for the reason the provider has given and voluntarily give their informed consent to enroll in and participate in the RPM program with the ordering provider. Portal 544 may prompt the patient to agree to a second statement accepting the terms of use. Each signature may be, for example, an e-signature. Once the patient has completed the consent forms, the RPM enrollment is complete. The patient's RPM status may be changed to "Enrolled." The healthcare provider may receive an email and/or a notification on healthcare provider portal 512 that the patient has enrolled.

Once the patient is enrolled in RPM, the patient's disparate source 560 may send data transmissions, including health data, to central system 500. The sensor 560 may sense, track, and measure the health data of the patient. Data transmission application 564 may extract/pull the health data from sensor 562. For example, data transmission application 564 may extract/pull the health data every 24 hours. Alternatively, sensor 560 may push the health data to data transmission application 564 continuously or periodically. Data transmission application 564 may form a health dataset from the health data. The health dataset may be transmitted to central system 500 using data transmission application 564. In an embodiment, data transmission application 564 may automatically transmit the health dataset to central system 500 after collecting a specified amount of health data. Additionally or alternatively, data transmission application 564 may transmit the health dataset to central system 500 upon request by either the patient or central system 500.

The API 506 may receive the data transmission from data transmission application 564. Each of the data transmissions may include one or more time stamps. In embodiments, the API 506 may receive health datasets from multiple different disparate sources of the same patient and/or from multiple different disparate sources of various patients. In some embodiments, the API 506 may receive multiple health datasets from the same disparate source 560 corresponding to the single patient.

The syncing engine 501 may determine whether the health data is in a correct format. For example, the health data may be received in JavaScript Object Notation (JSON) data-interchange format or eXtensible Markup Language (XML) format. The syncing engine 501 may determine whether the data format is acceptable by the database 548. In the event the health data is not in the correct format, the syncing engine 501 may normalize the data into a format accepted by the database 548. The healthcare data may include a disparate source ID from which the healthcare data was transmitted. The syncing engine 501 may determine the patient associated with the healthcare data using the disparate source ID. For example, the syncing engine 501 may correlate the disparate source ID in the healthcare data with the disparate source ID of disparate source 560 tied to the patient. The reimbursement engine 502 may store the healthcare data in the database 548 such that it is correlated to the patient record(s).

The syncing engine 501 may determine a date and time for the healthcare data from disparate source 560 based on the timestamp(s). The timestamp(s) may be generated when the data is generated, collected, or received by the disparate source and/or at the time disparate source 560 first attempted to transmit the data transmission. The healthcare data may be stored in the database 548 based on the timestamp and the disparate source ID. In this way, sequential data collected continuously or periodically by a disparate source but transmitted asynchronously to a central location can be ordered properly when combined with other sequential data received at the central location from other disparate sources.

The reimbursement engine 502 may determine whether the healthcare provider is eligible for any reimbursement based on the received healthcare data. For example, in response to receiving a minimum threshold number of days within a given time window, for a first time, the reimbursement engine 502 may determine that the healthcare provider is eligible for the set up reimbursement.

The reimbursement engine 502 may also track of frequency and amount of days of data transmissions from the patient. The reimbursement engine 502 may determine the healthcare provider is eligible for the data transmission reimbursement in response to determining there have been a minimum number of days of data transmissions for a patient in a specified time window and after a specified amount of days after the previous data transmission reimbursement eligibility was triggered or a specified amount of days after the date of enrollment.

The reimbursement engine 502 may also determine whether a healthcare provider is eligible for the treatment reimbursement. For example, a healthcare provider may use healthcare provider portal 512 to confirm that healthcare has been provided for a certain amount of time. For example, the healthcare provider may confirm that 20 minutes or more of clinical staff/physician/other qualified healthcare professional time in a calendar month have been provided. Furthermore, the reimbursement engine 502 may confirm that data transmissions have been received for a minimum threshold number of days within a given time window and after a specified amount of days have passed since the last triggered data transmission reimbursement eligibility or since the date of enrollment. In response to receiving the confirmation and that data transmissions have been received on a minimum threshold number of days within a given time window and after a specified amount of days have passed since the last triggered data transmission reimbursement eligibility, or since the date of enrollment, the reimbursement engine 502 may determine that the healthcare provider is eligible for treatment reimbursement for that patient.

The portal management engine 504 may render GUIs for healthcare provider portal 512 and portal 544. For example, the portal management engine 504 may generate and render a data transmission GUI (as shown in FIGS. 2-3) on the healthcare provider portal 512. The data transmission GUI may track data transmissions received from patients and indicate eligibility of a predefined action such as a data transmission reimbursement based on the data transmissions.

Figure 6:
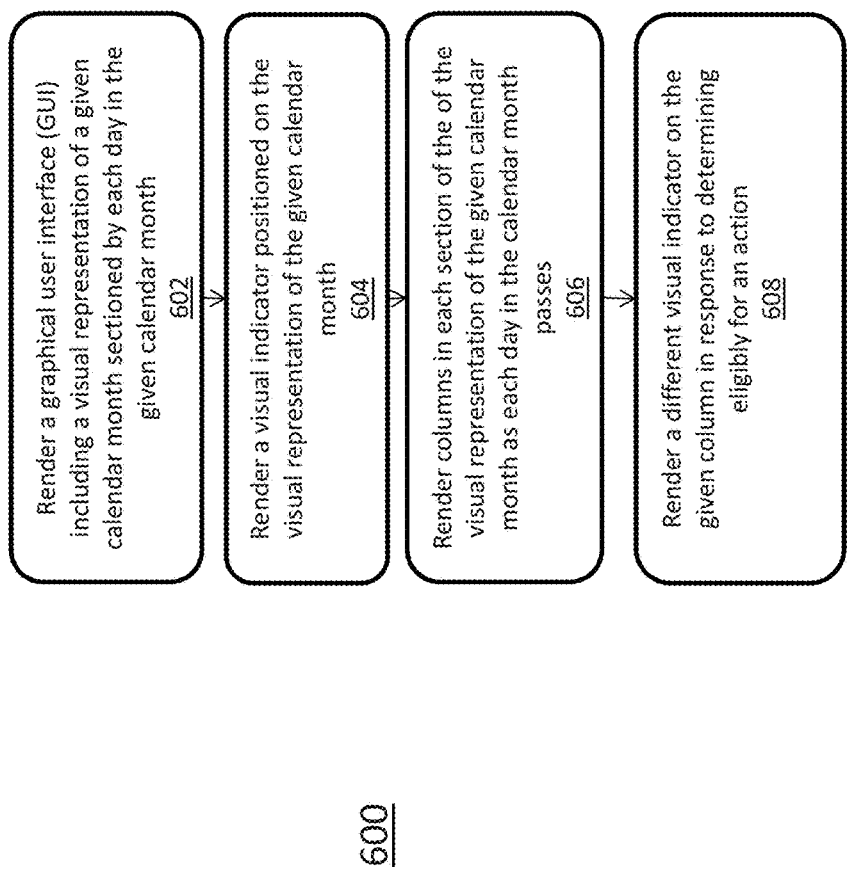
FIGS. 6-7 are flowcharts illustrating processes implemented by a system for rendering the GUI indicating eligibility for triggering action according to an example embodiment.

FIG. 6 is a flowchart illustrating a process 600 implemented by a system for rendering a graphical user interface (GUI) indicating reimbursement eligibility. It is to be appreciated the operations may occur in a different order, and some operations may not be performed.

In operation 602, the central system may render a graphical user interface (GUI) including a visual representation of a given calendar month sectioned by each day in the given calendar month.

In operation 604, the central system may render a visual indicator positioned on the visual representation of the given calendar month at a height corresponding to a threshold amount of days with data transmissions necessary within a given time period for triggering a predefined action.

In operation 606, the central system may render columns in each section of the visual representation of the given calendar month as each day in the calendar month passes, in response to receiving a data transmission on at least one day within the given time period. A height of each column increments a given amount in response to a total amount of days with a data transmission in the given time period being incremented. Furthermore, the height of a given column is higher or lower relative to the visual indicator based on a difference between the total amount of days with data transmissions within the given time period and the threshold amount of days with data transmissions necessary within the given time period for triggering a predefined action. Another visual indicator may be rendered on each of the columns of sections corresponding to days with received data transmissions. Furthermore, a line may be rendered dividing the days of the given month that have passed and days of the given month in the future on the visual representation of the calendar month.

In operation 608, the central system may render a different visual indicator on the given column in response to determining the total amount of days with data transmissions within the given time period is greater than or equal to the threshold amount of days with data transmissions necessary within the given time period for triggering a predefined action and a predefined amount of days have passed since a previously triggered predefined action. The different visual indicator indicates triggering of the predefined action.

Figure 7:
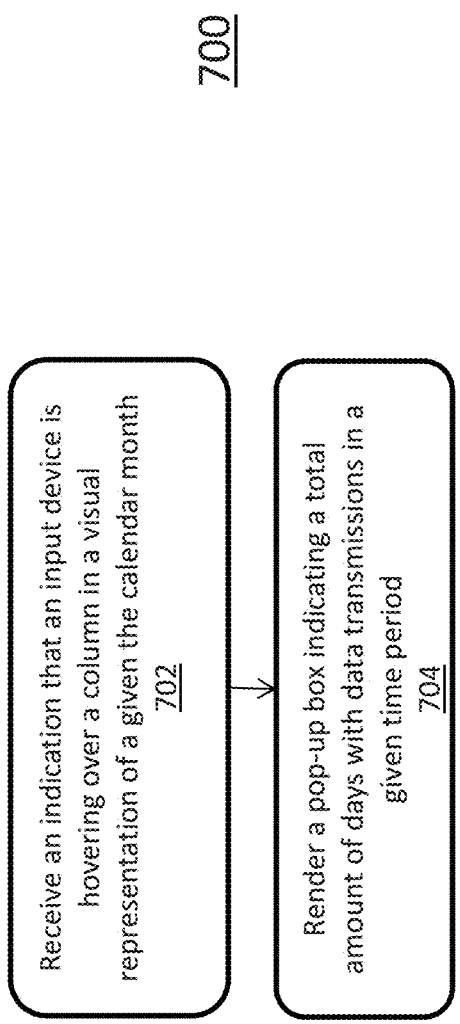

FIG. 7 is a flowchart illustrating a process 800 implemented by a system for rendering a graphical user interface (GUI) indicating reimbursement eligibility. It is to be appreciated the operations may occur in a different order, and some operations may not be performed.

In operation 702, the central system may receive an indication that an input device is hovering over a column in a visual representation of a given the calendar month.

In operation 704, the central system may render a popup box indicating a total amount of days with data transmissions in a given time period.

Figure 8:
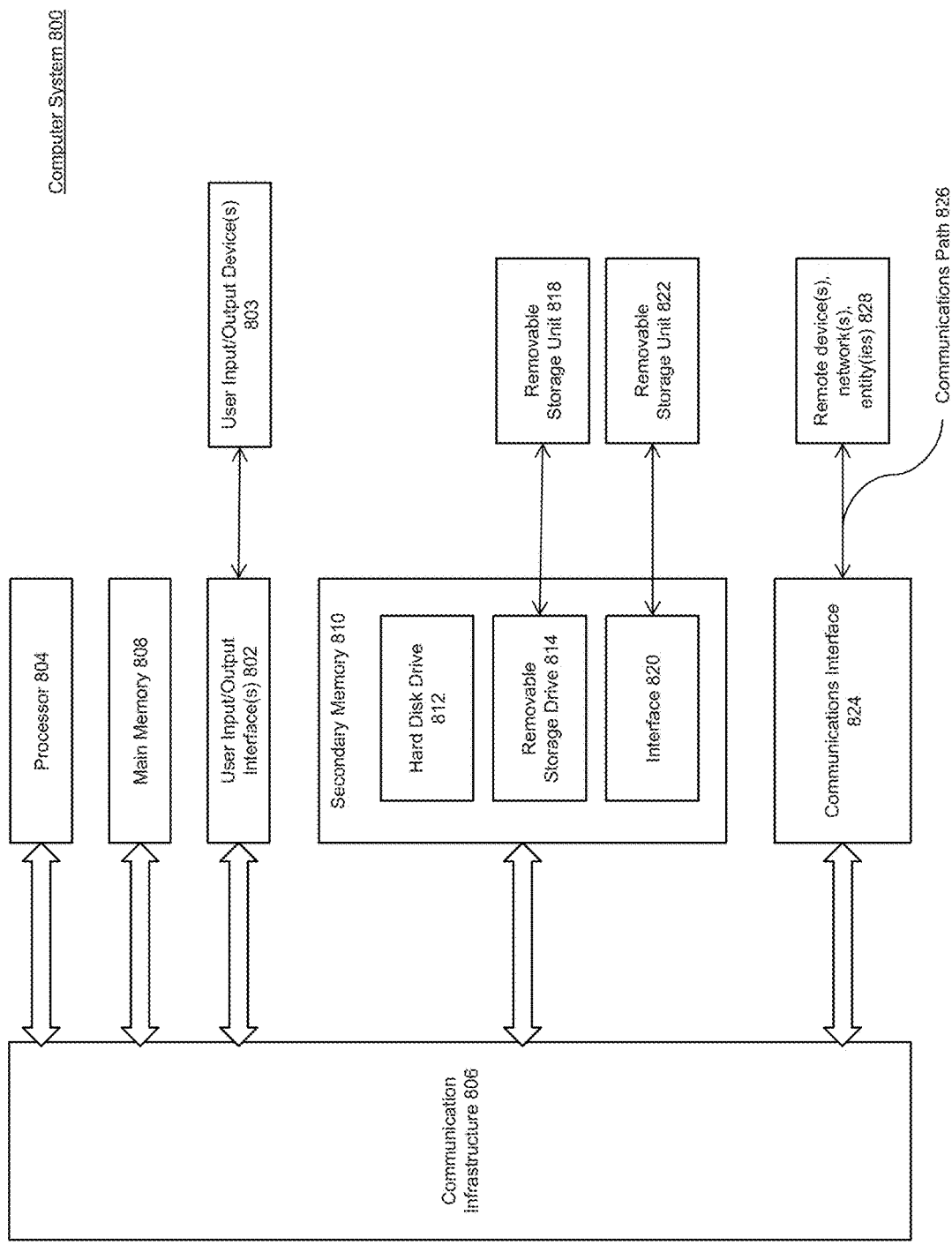
FIG. 8 is a block diagram of example components of a computing system according to an embodiment according to an example embodiment.

FIG. 8 is a block diagram of example components of device 800. One or more computer systems 800 may be used, for example, to implement any of the embodiments discussed herein, as well as combinations and sub-combinations thereof. Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814.

Removable storage drive 814 may interact with a removable storage unit 818. Removable storage unit 818 may include a computer usable or readable storage device having stored thereon computer software (control logic) and/or data. Removable storage unit 818 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), eXtensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for rendering a graphical user interface (GUI) indicating an eligibility for triggering action, the method comprising:
    rendering, by one or more computing devices, a graphical user interface (GUI) including a visual representation of a given calendar month sectioned by each day in the given calendar month;
    rendering, by the one or more computing devices, a first visual indicator positioned on the visual representation of the given calendar month at a height corresponding to a threshold number of days with data transmissions necessary within a given time period for triggering a predefined action;
    rendering, by the one or more computing devices, columns in each section of the of the visual representation of the given calendar month as each day in the calendar month passes, in response receiving a data transmission on at least one day within the given time period,
    wherein a height of each column increments a given amount relative to a total number of days with a data transmission within the given time period and a number of days having passed in the given time period in response to the total number of days with a data transmission in the given time period being incremented, and
    wherein the height of a given column is higher or lower relative to the first visual indicator based on a difference between the total number of days with data transmissions within the given time period and the threshold number of days with data transmissions necessary within the given time period for triggering a predefined action.

2. The method of claim 1, wherein the total number of days with data transmissions is determined by syncing asynchronously received data from disparate sources corresponding to a single individual.

3. The method of claim 1, further comprising rendering, by the one or more computing devices, a second visual indicator on each of the columns of sections corresponding to days with received data transmissions.

4. The method of claim 1, further comprising:
    rendering, by the one or more computing devices, a popup box indicating the total number of days with data transmissions within the given time period, in response to an input device hovering over the given column.

5. The method of claim 1, further comprising rendering, by the one or more computing devices, a third visual indicator on the visual representation of the calendar month dividing days of the given month that have passed and days of the given month in the future.

6. The method of claim 1, further comprising:
    selecting, by the one or more computing devices, the given month from a selection of months; and
    rendering, by the one or more computing devices, the visual representation of the given month in response to the selection of the given month.

7. The method of claim 1, further comprising rendering, by the one or more computing devices, a fourth visual indicator on the given column in response to determining the total number of days with data transmissions within the given time period is greater than or equal to the threshold number of days with data transmissions necessary within the given time period for triggering a predefined action and a predefined number of days have passed since a previously triggered predefined action, wherein the fourth visual indicator indicates triggering of the predefined action.

8. A system for rendering a graphical user interface (GUI) indicating an eligibility for triggering action, the system comprising:
    a memory;
    a processor coupled to the memory, the processor configured to:
        render a graphical user interface (GUI) including a visual representation of a given calendar month sectioned by each day in the given calendar month;
        render a first visual indicator positioned on the visual representation of the given calendar month at a height corresponding to a threshold number of days with data transmissions necessary within a given time period for triggering a predefined action;
        render columns in each section of the of the visual representation of the given calendar month as each day in the calendar month passes, in response receiving a data transmission on at least one day within the given time period,
        wherein a height of each column increments a given amount relative to a total number of days with a data transmission within the given time period and a number of days having passed in the given time period in response to the total number of days with a data transmission in the given time period being incremented, and
        wherein the height of a given column is higher or lower relative to the first visual indicator based on a difference between the total number of days with data transmissions within the given time period and the threshold number of days with data transmissions necessary within the given time period for triggering a predefined action.

9. The system of claim 8, wherein the total number of days with data transmissions is determined by syncing asynchronously received data from disparate sources corresponding to a single individual.

10. The system of claim 8, wherein the processor is further configured to render a second visual indicator on each of the columns of sections corresponding to days with received data transmissions.

11. The system of claim 8, wherein the processor is further configured to render a popup box indicating the total number of days with data transmissions within the given time period, in response to an input device hovering over the given column.

12. The system of claim 8, wherein the processor is further configured to render a third visual indicator on the visual representation of the calendar month dividing days of the given month that have passed and days of the given month in the future.

13. The system of claim 8, wherein the processor is further configured to render a fourth visual indicator on the given column in response to determining the total number of days with data transmissions within the given time period is greater than or equal to the threshold number of days with data transmissions necessary within the given time period for triggering a predefined action and a predefined number of days have passed since a previously triggered predefined action, wherein the fourth visual indicator indicates triggering of the predefined action.

14. The system of claim 13, wherein the processor is further configured to reset the total number of days with data transmissions to zero, a day after triggering the predefined action.

15. A non-transitory computer-readable medium having instructions stored thereon that, when executed by at least one computing device, cause the at least one computing device to perform operations comprising:
   render a graphical user interface (GUI) including a visual representation of a given calendar month sectioned by each day in the given calendar month;
   render a first visual indicator positioned on the visual representation of the given calendar month at a height corresponding to a threshold number of days with data transmissions necessary within a given time period for triggering a predefined action;
   render columns in each section of the of the visual representation of the given calendar month as each day in the calendar month passes, in response receiving a data transmission on at least one day within the given time period,
   wherein a height of each column increments a given amount relative to a total number of days with a data transmission within the given time period and a number of days having passed in the given time period in response to the total number of days with a data transmission in the given time period being incremented, and
   wherein the height of a given column is higher or lower relative to the first visual indicator based on a difference between the total number of days with data transmissions within the given time period and the threshold number of days with data transmissions necessary within the given time period for triggering a predefined action.

16. The non-transitory computer readable medium of claim 15, wherein the total number of days with data transmissions is determined by syncing asynchronously received data from disparate sources corresponding to a single individual.

17. The non-transitory computer readable medium of claim 15, the operations further comprising rendering a second visual indicator on each of the columns of sections corresponding to days with received data transmissions.

18. The non-transitory computer readable medium of claim 15, the operations further comprising rendering a popup box indicating the total number of days with data transmissions within the given time period, in response to an input device hovering over the given column.

19. The non-transitory computer readable medium of claim 15, the operations further comprising rendering a third visual indicator on the visual representation of the calendar month dividing days of the given month that have passed and days of the given month in the future.

20. The non-transitory computer readable medium of claim 15, the operations further comprising rendering a fourth visual indicator on the given column in response to determining the total number of days with data transmissions within the given time period is greater than or equal to the threshold number of days with data transmissions necessary within the given time period for triggering a predefined action and a predefined number of days have passed since a previously triggered predefined action, wherein the fourth visual indicator indicates triggering of the predefined action.

* * * * *

UNITED STATES PATENT AND TRADEMARK OFFICE
CERTIFICATE OF CORRECTION

PATENT NO. : 11,397,599 B2
APPLICATION NO. : 17/139524
DATED : July 26, 2022
INVENTOR(S) : Preston et al.

Page 1 of 1

It is certified that error appears in the above-identified patent and that said Letters Patent is hereby corrected as shown below:

On the Title Page

In item (57) ABSTRACT, replace "The central system may further render columns in each section of the of the visual representation" with --The central system may further render columns in each section of the visual representation--.

In the Claims

In Column 17, Lines 53-54, replace "columns in each section of the of the visual representation" with --columns in each section of the visual representation--.

In Column 18, Lines 53-54, replace "render columns in each section of the of the visual representation" with --render columns in each section of the visual representation--.

In Column 19, Lines 49-50, replace "render columns in each section of the of the visual representation" with --render columns in each section of the visual representation--.

Signed and Sealed this
Twenty-third Day of May, 2023

Katherine Kelly Vidal
*Director of the United States Patent and Trademark Office*